UNITED STATES PATENT OFFICE.

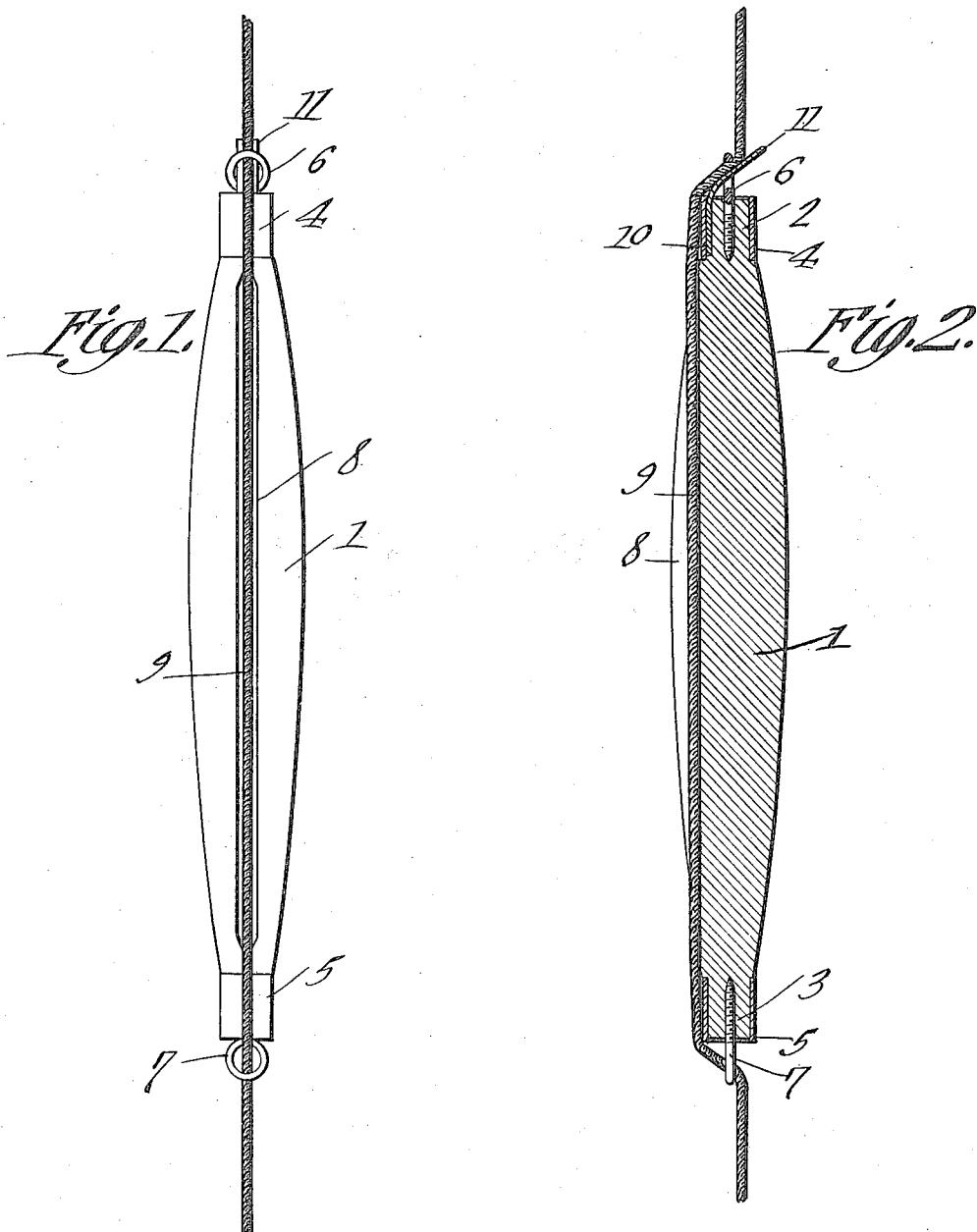

WILLIAM A. EASLICK, OF MILAN, MICHIGAN.

FISHING-FLOAT.

1,157,517. Specification of Letters Patent. Patented Oct. 19, 1915.

Application filed May 24, 1915. Serial No. 30,148.

*To all whom it may concern:*

Be it known that I, WILLIAM A. EASLICK, a citizen of the United States, residing at Milan, in the county of Washtenaw and State of Michigan, have invented a new and useful Fishing-Float, of which the following is a specification.

The present invention appertains to fishing floats or bobbers, and aims to provide a fishing float or bob having means for gripping the line, whereby the float may be readily released and adjusted along the line to the desired position, and so that the float will be effectively held in the position to which it is adjusted.

It is the object of the invention to provide a float or bobber having unique, yet simple and effective means for gripping or clamping the line to adjustably hold the float or bobber in place relative to the line.

It is also within the scope of the invention to provide a float having the features above noted, and which at the same time, is comparatively inexpensive in construction, as well as being practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved fishing float or bobber. Fig. 2 is a longitudinal section thereof taken on the line 2—2 of Fig. 1.

In carrying out the invention, the float embodies a buoyant body 1 of fusiform or other suitable contour, and having the reduced cylindrical ends 2 and 3 onto which metallic ferrules 4 and 5, respectively, are slipped or fitted. Eye screws 6 and 7 have their shanks threaded into the ends 2 and 3, respectively, of the float body 1, and the body 1 is provided at one side with a longitudinal groove 8 receiving the line 9, the line 9 being passed through the eyes of the screws 6 and 7, whereby the float is movable along the line, when the line and float are free to move relative to one another.

As a simple and effective means for holding the body 1 in place upon the line 9, a leaf spring 10 has its butt or basal end slipped of fitted tightly between the end 2 of the body 1 and the ferrule 4, and the free portion 11 of the leaf spring is bent angularly and extended diagonally or obliquely through the eye of the screw 6. The line 9 passes between the free portion 11 of the leaf spring 10 and the outer portion of the eye of the screw 6, whereby the line 9 will be clamped or gripped between the eye of the screw 6 and the leaf spring when the leaf spring is released. The leaf spring has a tension whereby the free portion 11 thereof bears against the outer portion of the eye of the screw 6. The leaf spring 10 can be readily applied to the float, and by pressing the free end of the leaf spring away from the outer portion of the eye of the screw 6, the line will be released, so that the float may be readily adjusted along the line. As soon as the leaf spring is released, the float will again be clamped in position upon the line, and the float and line are not liable to become displaced relative to one another. The leaf spring 10 in passing through the eye of the screw 6 prevents the screw 6 from unscrewing, and the screw 6 and leaf spring therefore each holds the other in place. The screw 6 also prevents the leaf spring from being bent out of operative position, and the leaf spring will not encumber the float in an appreciable or undesirable manner.

The present improvement may be incorporated in various floats for bobbers, and is of advantage for obvious reasons.

It is to be noted that when the line is reeled in so that the float strikes the end of the fishing pole (not shown), the spring 11 in bearing against the fishing pole will flex slightly to allow the line to slide past the float without difficulty.

Having thus described the invention, what is claimed as new is:—

1. A float having an eye for the passage of a line therethrough and having a leaf spring extending through said eye for clamping the line therein.

2. A fishing float embodying a body, an eye screw having its shank threadedly engaged into the body, and a leaf spring secured to the body and extending through said eye for clamping a line within the eye.

3. A float embodying a body, a ferrule fitted upon one end thereof, an eye screw having its shank threaded into said end of the body, and a leaf spring having its basal end fitted between said end of the body and the ferrule, the leaf spring having its free portion extended diagonally through the eye of said screw.

In testimony that I claim the foregoing as my own, I have hereto affixed my signature in the presence of two witnesses.

WILLIAM A. EASLICK.

Witnesses:
MILTON H. HACK,
ESSIE M. EASLICK.

Copies of this patent may be obtained for five cents each, by addressing the "Commissioner of Patents, Washington, D. C."